(12) United States Patent
Kim et al.

(10) Patent No.: US 11,325,532 B2
(45) Date of Patent: May 10, 2022

(54) DRIVER ASSISTANCE SYSTEM, METHOD FOR CONTROLLING THE SAME, AND RADAR DEVICE

(71) Applicant: MANDO MOBILITY SOLUTIONS CORPORATION, Pyeongtaek-si (KR)

(72) Inventors: Jae Suk Kim, Yongin-si (KR); Tae Bong Noh, Yongin-si (KR)

(73) Assignee: MANDO MOBILITY SOLUTIONS CORPORATION, Pyeongtaek-si (KR)

( * ) Notice: Subject to any disclaimer, the term of this patent is extended or adjusted under 35 U.S.C. 154(b) by 193 days.

(21) Appl. No.: 16/653,041

(22) Filed: Oct. 15, 2019

(65) Prior Publication Data

US 2020/0114821 A1 Apr. 16, 2020

(30) Foreign Application Priority Data

Oct. 15, 2018 (KR) .................. 10-2018-0122868

(51) Int. Cl.
| | |
|---|---|
| *B60Q 9/00* | (2006.01) |
| *G01S 13/93* | (2020.01) |
| *G01S 13/931* | (2020.01) |
| *B60R 1/12* | (2006.01) |

(52) U.S. Cl.
CPC ............ *B60Q 9/008* (2013.01); *G01S 13/931* (2013.01); *B60R 1/1207* (2013.01); *G01S 2013/9315* (2020.01); *G01S 2013/93272* (2020.01)

(58) Field of Classification Search
CPC .......... B60Q 1/346; B60Q 1/38; B60Q 9/008; B60R 1/1207; G01S 13/878; G01S 13/931; G01S 2013/9315; G01S 2013/93272; G01S 7/003

See application file for complete search history.

(56) References Cited

U.S. PATENT DOCUMENTS

| | | | |
|---|---|---|---|
| 2010/0286875 A1* | 11/2010 | Inoue ................... | B62D 15/027 701/49 |
| 2013/0063257 A1* | 3/2013 | Schwindt ........ | B60W 30/18163 340/425.5 |
| 2015/0232028 A1* | 8/2015 | Reardon .................. | B60R 1/12 348/148 |
| 2017/0115378 A1* | 4/2017 | Haghighi .............. | G01S 7/4052 |
| 2017/0305375 A1* | 10/2017 | Abt ........................ | G01S 13/723 |
| 2017/0307732 A1* | 10/2017 | Haghighi .............. | G01S 13/931 |

\* cited by examiner

*Primary Examiner* — Sisay Yacob
(74) *Attorney, Agent, or Firm* — Hauptman Ham, LLP (57) ABSTRACT

A driver assistance system, a method for controlling the same, and a radar device are disclosed. The driver assistance system includes a first radar sensor, a second radar sensor, and at least one human machine interface (HMI). The first radar sensor monitors a first rear-lateral sense region, and acquires first radar data from the first rear-lateral sense region. The second radar sensor monitors a second rear-lateral sense region, acquires second radar data from the second rear-lateral sense region, receives the first radar data from the first radar sensor through Direct communication, and identifies an object based on the first radar data or the second radar data. The human machine interface (HMI) displays a warning control signal through in-vehicle communication when the second radar sensor performs warning decision.

14 Claims, 9 Drawing Sheets

DRIVER ASSISTANCE SYSTEM, METHOD FOR CONTROLLING THE SAME, AND RADAR DEVICE

CROSS-REFERENCE TO RELATED APPLICATION

This application is based on and claims priority under 35 U.S.C. § 119 to Korean Patent Application No. 10-2018-0122868, filed on Oct. 15, 2018 in the Korean Intellectual Property Office, the disclosure of which is incorporated by reference in its entirety.

BACKGROUND

1. Field

Embodiments of the present disclosure relate to a driver assistance system, and more particularly to a driver assistance system, a method for controlling the same, and a radar device, which can perform driver warning and control based on an object detected by a rear radar device.

2. Description of the Related Art

A vehicle is a machine which travels on roads or tracks to carry people or objects from place to place. Vehicles may move in various directions according to rotation of at least one wheel mounted to a vehicle body.

In recent times, in order to mitigate driver difficulty as well as to increase driver's convenience during vehicle driving, many developers and companies are conducting intensive research into a vehicle provided with a advanced driver assistance system), such that the DAS-embedded vehicle can actively provide the driver with various kinds of information, for example, vehicle states, driver's states, peripheral environment information, etc.

A representative example of the DAS embedded in the vehicle may include a Forward Collision Avoidance (FCA) system, an Autonomous Emergency Brake (AEB) system, a Driver Attention Warning (DAW) system, etc. The DAS may determine the degree of possibility of collision between a host vehicle provided with the DAS and another peripheral vehicle (or an oncoming vehicle) during driving of the host vehicle. If there is a high possibility of collision between the host vehicle and other vehicles, the DAS may allow the host vehicle to perform emergency braking so as to avoid collision between the host vehicle and other vehicles.

However, in association with data transmission between in-vehicle sensors needed to operate various DASs, a difference in data creation time between the in-vehicle sensors or a time delay encountered in the data transmission process needs to be considered in implementation of various DAS operations.

SUMMARY

Therefore, it is an aspect of the present disclosure to provide a technology for eliminating a time delay encountered in a data transmission process during data integration of radar sensors in a driver assistance system of a vehicle provided with radar sensor units.

It is another aspect of the present disclosure to provide a technology for improving accuracy of object information using radar sensor units, and allowing only one unit to perform various functions (e.g., a function for determining the possibility of danger or riskiness, a function for generating a warning message, a control function) in an integrated manner.

Additional aspects of the invention will be set forth in part in the description which follows and, in part, will be obvious from the description, or may be learned by practice of the invention.

In accordance with an aspect of the present disclosure, a driver assistance system includes a first radar unit, a second radar unit, and at least one human machine interface (HMI). The first radar unit monitors a first rear-lateral sense region, and acquires first radar data from the first rear-lateral sense region. The second radar unit monitors a second rear-lateral sense region, acquires second radar data from the second rear-lateral sense region, receives the first radar data from the first radar unit through Direct communication, and identifies an object based on the first radar data or the second radar data. The human machine interface (HMI) displays a warning control signal through in-vehicle communication when the second radar unit performs warning decision.

The second radar unit may perform the warning decision either when the object is identified in a predetermined threshold sense region or when the object is approaching the sense region at a higher speed than a threshold speed.

When the warning decision is carried out, the second radar unit may transmit the warning control signal to the first radar unit through the Direct communication.

The human machine interface (HMI) including a first HMI and a second HMI. The first HMI may receive the warning control signal from the first radar unit through Direct Hardwires, and may directly output the received warning control signal. The second HMI may receive the warning control signal from the second radar unit through Direct Hardwires, and may directly output the received warning control signal.

The second radar unit may calculate route information including curve information of a road on which a vehicle is traveling.

The human machine interface (HMI) may output the warning control signal, when the second radar unit performs warning decision and receives a signal indicating an intention of a vehicle driver who desires to perform lane change.

Each of the first HMI and the second HMI may output the warning control signal as a blinking signal.

In accordance with another aspect of the present disclosure, a method for controlling a driver assistance system includes acquiring first radar data by a first radar unit having a first rear-lateral sense region, acquiring second radar data by a second radar unit having a second rear-lateral sense region, receiving, by the second radar unit, the first radar data from the first radar unit through Direct communication, identifying, by the second radar unit, an object based on the first radar data or the second radar data, and if the second radar unit performs warning decision based on the identified object, displaying a warning control signal through in-vehicle communication.

The identifying the object may include performing the warning decision either when the object is identified in a predetermined threshold sense region or when the object is approaching the sense region at a higher speed than a threshold speed.

The identifying the object may further include transmitting the warning control signal to the first radar unit through the Direct communication when the warning decision is carried out.

The displaying the warning control signal may include receiving, by a first human machine interface (HMI), the warning control signal from the first radar unit through Direct Hardwires, and directly outputting the received warning control signal, and receiving, by a second human machine interface (HMI), the warning control signal from the second radar unit through Direct Hardwires, and directly outputting the received warning control signal.

The method may further include calculating route information including curve information of a road on which a vehicle is traveling.

The displaying the warning control signal may further include, when the second radar unit performs warning decision and receives a signal indicating an intention of a vehicle driver who desires to perform lane change, outputting the warning control signal.

The displaying the warning control signal may include outputting, by each of the first HMI and the second HMI, the warning control signal as a blinking signal.

In accordance with another aspect of the present disclosure, a radar device includes a first radar unit configured to monitor a first rear-lateral sense region, and acquire first radar data from the first rear-lateral sense region, and a second radar unit configured to monitor a second rear-lateral sense region, and acquire second radar data from the second rear-lateral sense region, receive the first radar data from the first radar unit through Direct communication, identify an object based on the first radar data or the second radar data, and transmit a warning control signal to an external device through in-vehicle communication when warning decision is performed based on the identified object.

The second radar unit may perform the warning decision either when the object is identified in a predetermined threshold sense region or when the object is approaching the sense region at a higher speed than a threshold speed.

When the warning decision is carried out, the second radar unit may transmit the warning control signal to the first radar unit through the Direct communication.

The second radar unit may calculate route information including curve information of a road on which a vehicle is traveling.

When the second radar unit performs warning decision and receives a signal indicating an intention of a vehicle driver who desires to perform lane change, the second radar unit may re-output the warning control signal to the external device.

The first radar unit may transmit the warning control signal to a first external device through Direct Hardwires. The second radar unit may transmit the warning control signal to a second external device through Direct Hardwires.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. The scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

Figure 1:
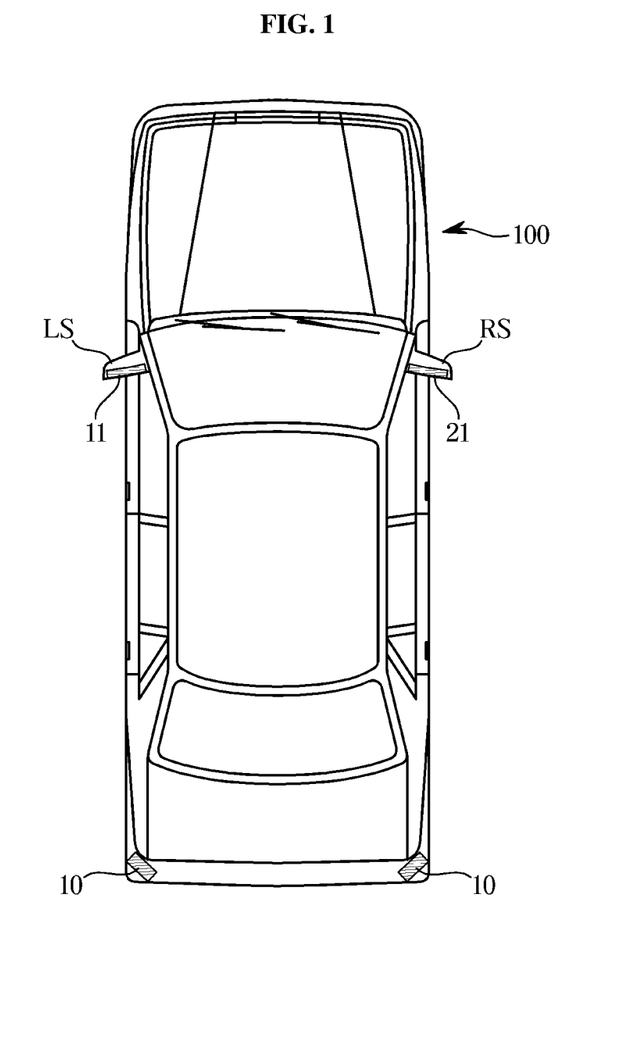
FIG. 1 is a top view illustrating the appearance of a vehicle provided with radar sensor units according to an embodiment of the present disclosure.
Figure 2:
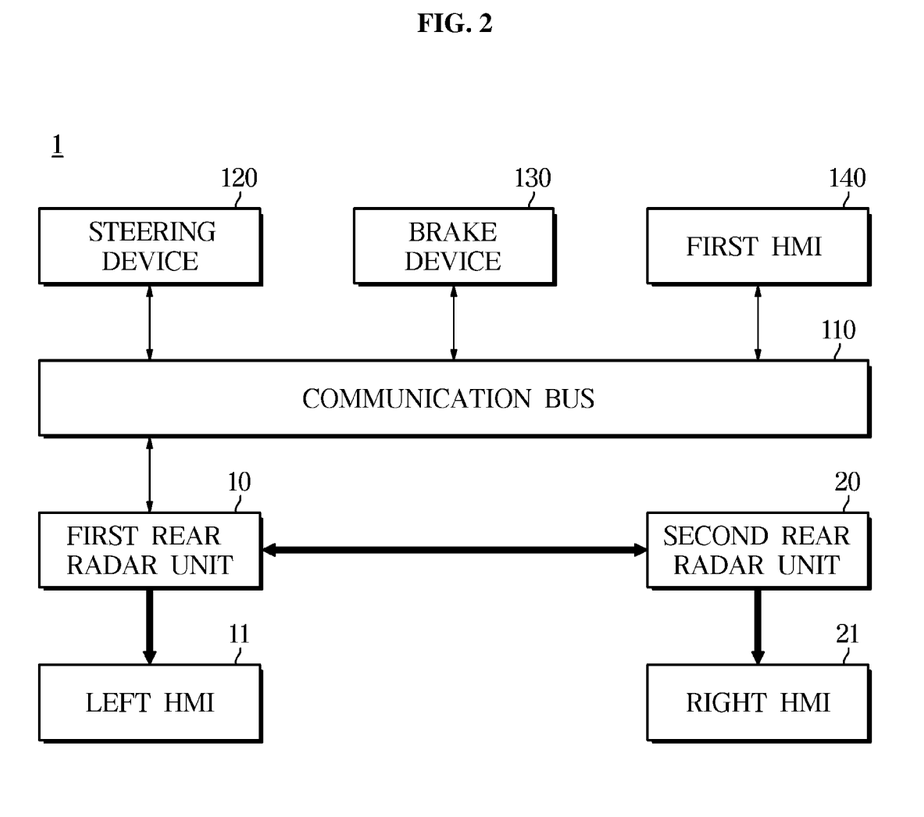
FIG. 2 is a block diagram illustrating a driver assistance system according to an embodiment of the present disclosure.
Figure 3:
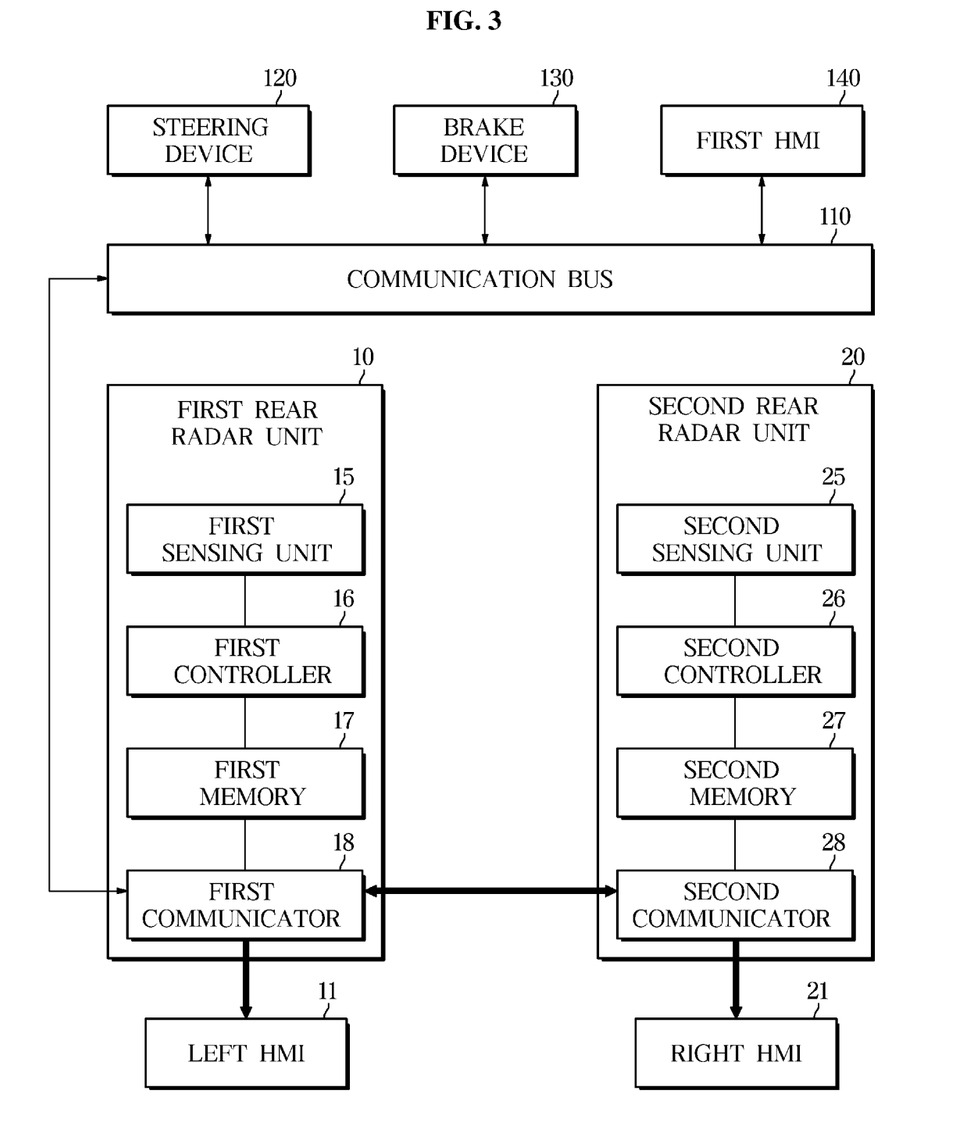
FIG. 3 is a detailed block diagram illustrating a driver assistance system according to an embodiment of the present disclosure.

FIG. 1 is a top view illustrating the appearance of a vehicle provided with a radar sensor unit according to an embodiment of the present disclosure. FIG. 2 is a block diagram illustrating a driver assistance system (DAS) according to an embodiment of the present disclosure. FIG. 3 is a detailed block diagram illustrating a driver assistance system according to an embodiment of the present disclosure.

Referring to FIG. 1, a vehicle 100 may include two radar sensor units 10 and 20. The two radar sensor units 10 and 20 may be mounted to the rear of the vehicle 100. Although not shown in FIG. 1, not only the two radar sensor units 10 and 20, but also other radar sensor units may also be mounted to any other positions of the vehicle 100 as necessary.

The vehicle 100 may include a first rear radar unit 10 and a second rear radar unit 20. The first rear radar unit 10 may be mounted to a rear left part of the vehicle 100, and may detect an object present in a left lateral region and an object present in a rear left region with respect to the vehicle 100. The second rear radar unit 20 may be mounted to a rear right part of the vehicle 100, and may detect an object present in a right lateral region and an object present in a rear right region with respect to the vehicle 100.

The vehicle 100 may include a plurality of Human Machine Interfaces (HMIs) capable of visually informing either a driver of the vehicle 100 or users located in the vicinity of the vehicle 100 of a warning message or notification message. For example, the vehicle 100 may include a left side-view mirror LS and a right side-view mirror RS, and may further include a reflective mirror through which the driver can view a backward region of the vehicle 100. The vehicle 100 may include a left Human Machine Interface (HMI) 11 embedded in the left side-view mirror LS and a right HMI 21 embedded in the right side-view mirror RS. The left HMI 11 and the right HMI 21 may be implemented as light emitting diode (LED) lights, and may blink to inform the driver or users of a warning or notification message. For example, the left HMI 11 may blink when the vehicle 100 moves from a current lane to a left lane or turns left, and the right HMI 21 may blink when the vehicle 100 moves from a current lane to a right lane or turns right.

The vehicle 100 may further include an additional HMI as necessary, and a detailed description thereof will hereinafter be given with reference to FIG. 2.

The vehicle 100 may include a driver assistance system 1 implemented by software. The DAS 1 may perform data communication with various electronic devices embedded in the vehicle 100.

Although various electronic devices embedded in the vehicle 100 have been disclosed as constituent elements of the DAS 1 as shown in FIG. 2, the DAS 1 may not always include various electronic devices embedded in the vehicle 100.

As illustrated in FIG. 2, the DAS 1 may be configured to perform warning of the detected objects as well as to perform warning control, may include a steering device 120, a brake device 130, a first HMI 140, a first rear radar unit 10, a left HMI 11, a second rear radar unit 20, and a right HMI 21, and may further include a communication bus 110 to communicate with the above-mentioned devices 120, 130, 140, 10, 11, 20, and 21.

In this case, a vehicle communication network (NT) communicating with the communication bus 110 is able to perform Controller Area Network (CAN) communication. However, the scope or spirit of the present disclosure is not limited to CAN communication. For example, the communication bus 110 may perform data communication through Ethernet, Media Oriented Systems Transport (MOST), a FlexRay, a Controller Area Network (CAN), a Local Interconnect Network (LIN), etc. However, communication based on the communication bus 110 according to the present disclosure may be exemplarily set to CAN communication for convenience of description and better understanding of the present disclosure.

For example, decision information processed by the first rear radar unit 10 may pass through the communication bus 110, such that a control signal can be transmitted to the steering device 120, the brake device 130, and the first HMI 140. That is, as can be seen from communication denoted by solid lines in FIG. 2, the control signal can be transmitted to the steering device 120, the brake device 130, and the first HMI 140 after passing through the communication bus 11.

In this case, the steering device 120 to operate by the control signal received through the communication bus 11 may assist the driver in easily controlling the steering wheel. For example, when the vehicle is driving at low speed or is parking in any place, the steering device 120 may assist the driver steering to reduce steering force. When the vehicle is driving at high speed, the steering device 120 may assist the driver in steering to increase steering force. If necessary, the steering device 120 according to one embodiment may also assist the driver steering to avoid collision with the detected peripheral objects.

Subsequently, the brake device 130 may control the brake device of the vehicle in response to a brake command of the driver who depresses a brake pedal. In addition, the brake device 130 may maintain balance of the vehicle 100. For example, the brake device 130 may perform electric parking braking (EPB), may prevent slippage of wheels during braking, and/or may prevent slippage of wheels during steering. Therefore, the brake device 130 may control vehicle braking based on a control signal received through the communication bus 110.

The first HMI 140 may include a cluster display, and may be located close to a windshield, such that the first HMI 140 may allow the driver to acquire operation information of the vehicle 100, road information, a traveling route, etc. on the condition that the driver's eyes do not greatly deviate from the forward region of the vehicle 100. For example, warning decision information acquired by the first rear radar unit 10 may be displayed on the first HMI 140 such that the driver can recognize such warning information.

The DAS 1 may include various device-to-device (D2D) communication methods, for example, a communication method based on the communication bus, a Direct Hardwire communication method, and a Direct communication method based on Direct communication wires.

For example, the first rear radar unit 10 and the second rear radar unit 20 may communicate with each other based on Direct communication wires (Direct communication). For example, information about any object detected by the second rear radar unit 20 may be transmitted to the first rear radar unit 10 after passing through the Direct communication circuit. The first rear radar unit 10 may transmit a decision and control signal for the detected object information to the second rear radar unit 20.

In another example, the first rear radar unit 10 may transmit a control signal to the left HMI 11 after passing through Direct Hardwires. The second rear radar unit 20 may transmit a control signal to the right HMI 21 after passing through Direct Hardwires. That is, a warning signal for warning the driver of the presence of an object in the rear left region sensed by the first rear radar unit 10 may be displayed on the left HMI 11, and a warning signal for warning the driver of the presence of an object in the rear right region sensed by the first rear radar unit 10 may be received by the second rear radar unit 10, such that the second rear radar unit 10 may allow the right HMI 21 to display the received warning signal.

The above-mentioned description has disclosed various constituent elements of the DAS 1 and various communication methods between the constituent elements of the DAS 1.

The first and second rear radar units 10 and 20 embedded in the DAS 1 will hereinafter be described with reference to the attached drawings.

Each of the radar units 10 and 20 may include at least one radar sensor. On the assumption that signal emission (or signal transmission) and signal reception are carried out at only one place, the radar units 10 and 20 may be configured to detect the position of any object using reflective waves reflected from the object by signal emission.

In order to easily discriminate between transmitted (Tx) waves and received (Rx) waves by preventing overlap between the Tx and Rx waves, the radar sensors may use the Doppler effect, may change a frequency of the Tx waves according to lapse of time, or may use pulse waves as the Tx waves as necessary.

The first rear radar unit 10 may include a first sensing unit 15, a first controller 16, a first memory 17, and a first communicator 18. Similarly, the second rear radar unit 20 may include a second sensor unit 25, a second controller 26, a second memory 27, and a second communicator 28.

Common operations to be commonly applied to the first rear radar unit 10 and the second rear radar unit 20 will hereinafter be described simultaneously, and unique operations of the first rear radar unit 10 and the second rear radar unit 20 will then be described later.

Figure 4:
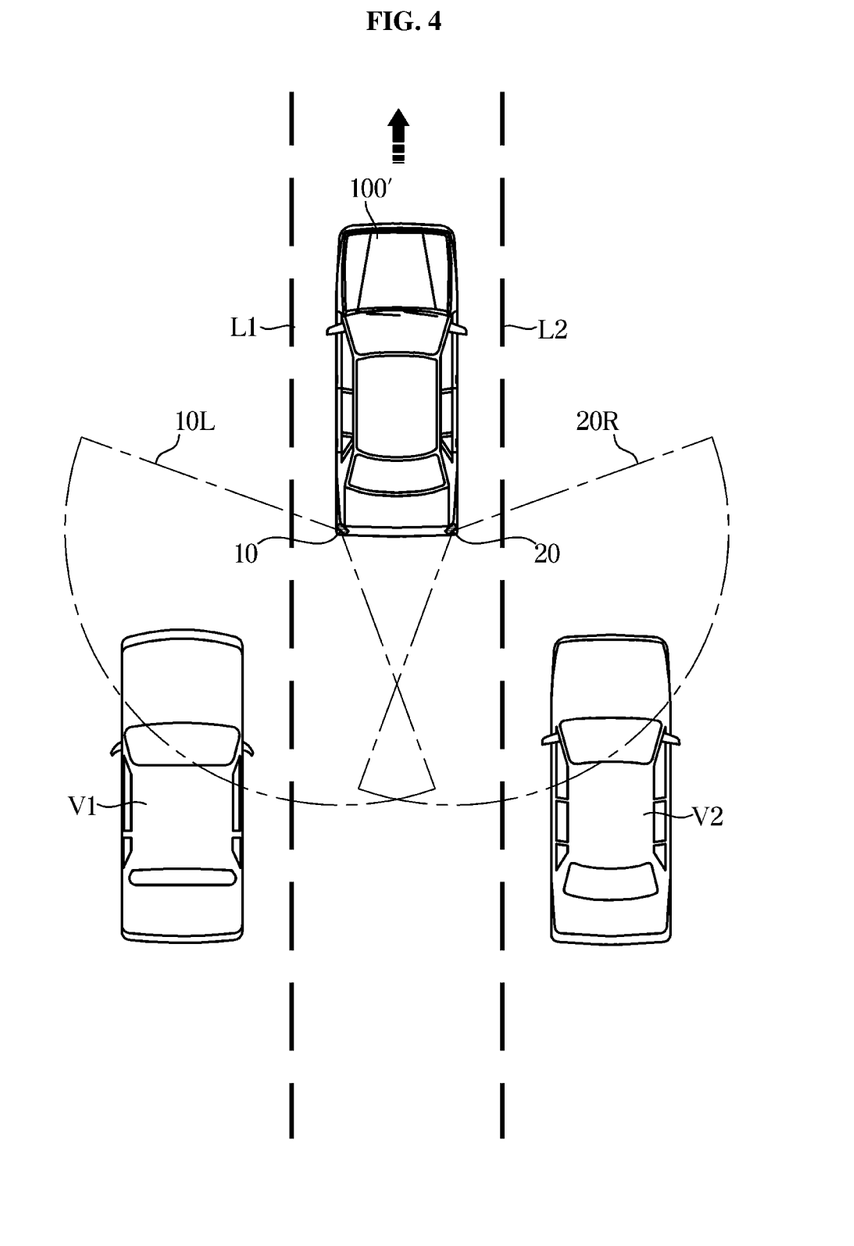
FIG. 4 is a conceptual diagram illustrating a method for operating radar devices of an DAS-embedded vehicle according to an embodiment of the present disclosure.

First, the first sensing unit 15 and the second sensing unit 25 may detect the presence or absence of peripheral obstacles present in the backward region of the vehicle. The first sensing unit 15 may detect the presence or absence of an object in the left lateral region and the backward region of the vehicle. The second sensing unit 25 may detect the presence or absence of an object in the right lateral region and the backward region of the vehicle. In more detail, FIG. 4 is a conceptual diagram illustrating a method for operating radar devices of a vehicle provided with the DAS 1 according to an embodiment of the present disclosure. For convenience of description and better understanding of the present disclosure, a region sensed by the first sensing unit 15 of the first rear radar unit 10 will hereinafter be denoted by a fan-shaped region 10L, and a region sensed by the second sensing unit 25 of the second rear radar unit 20 will hereinafter be denoted by a fan-shaped region 20R.

Each of the first controller 16 and the second controller 26 may be a Central Processing Unit (CPU) or a microcontroller unit (MCU), or may be a processor.

The first controller 16 or the second controller 26 may be implemented as a memory (not shown) to store an algorithm for controlling constituent elements of the first rear radar unit 10 or the second rear radar unit 20 or data of a program related to the algorithm, or may be implemented as a processor (not shown) for performing the above-mentioned operation using data stored in the memory. In this case, the memory and the processor may be implemented as different chips. Alternatively, the memory and the processor may also be implemented as a single chip as necessary.

The first memory 17 may store an output signal related to an object detected by the first sensing unit 15. The second memory 27 may store an output signal related to an object detected by the second sensing unit 25. Each memory 17 or 27 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto. Each of the first and second memories 17 and 27 may be a memory that is implemented as a separate chip independent of the above processor related to the controller, or may be implemented as a processor and a single chip.

A Device-to-Device (D2D) communication method between the first communicator 18 and the second communicator 28 may include a Direct Hardware communication method and a Direct communication method based on Direct communication wires. The first communicator 18 may additionally perform CAN communication based on the communication bus.

The first controller 16 for controlling the first rear radar unit 10 and the second controller 26 for controlling the second rear radar unit 20 will hereinafter be described in detail.

The second controller 26 of the second rear radar unit 20 may transmit a control signal to the second sensing unit 25 so as to detect whether any object is present in a rear right region with respect to the vehicle. The second controller 26 may control information detected by the second sensing unit 26 to be stored in the second memory 27, and may also control the detected information to be transmitted to the first rear radar unit 10 through the second communicator 28. In addition, the second controller 27 may also control the second communicator 28 to receive the warning signal from the first rear radar unit 10 as well as to transmit the received warning signal to the right HMI 120. That is, whereas the second rear radar unit 20 can detect the presence or absence of an object in the rear right region, it is impossible for the second rear radar unit 20 to perform warning decision of the detected object. Subsequently, operations of the first controller 16 contained in the first rear radar unit 10 will hereinafter be described. However, although the first controller 16 and the second controller 26 are designed to operate in different ways, the first rear radar unit 10 capable of detecting the presence or absence of an object in the rear left region with respect to the vehicle need not always perform the operation of the first controller 16, and it should be noted that the second controller 26 of the second rear radar unit can also perform the operation of the first controller 16.

For example, the first controller 16 may receive information about the traveling route of the vehicle 100, such that the first controller 16 may calculate information about a road route based on the received traveling route information. For example, the first controller 16 may calculate curve information of a vehicle lane (L1 or L2 of FIG. 4).

In addition, the first controller 16 may receive information about the position, speed, length, width, etc. of the object through a Direct communication line connected to the second rear radar unit 20, such that the first controller 16 may detect and decide occurrence or non-occurrence of a warning control message for warning the driver of the received object. That is, the first controller 16 may directly calculate information sensed by the first sensing unit 15 and information sensed by the second sensing unit 25, such that the first controller 16 may generate a warning signal or may output a control signal based on the calculated information.

For example, if a warning signal for the rear right region with respect to the vehicle is needed, the first controller 16 may transmit the warning signal to the second rear radar unit 20 through Direct communication lines, and the second rear radar unit 20 may display a warning signal on the right HMI 21 through Direct Hardwires. In addition, the first controller 16 may display the warning signal on the right HMI 21 while simultaneously transmitting the warning signal to the communication bus 110, such that the first controller 16 may also display the warning signal on the first HMI 140 as necessary.

For example, if the warning signal for the rear left region with respect to the vehicle is needed, the first controller 16 may display the warning signal on the left HMI 11 through Direct Hardwires. Moreover, the first controller 16 may display the warning signal on the left HMI 11 while simultaneously transmitting the warning signal to the communication bus 110, such that the first controller 16 may display the warning signal on the first HMI 140 as necessary.

In more detail, when it is determined that an object is present in a blind spot of the rear lateral region of the vehicle 100 or quickly approaches the vehicle 100 using information about the position and speed of an object detected in the rear lateral region (i.e., the rear left region and the rear right region) with respect to the vehicle, the first controller 16 may determine that there is a high possibility of collision between the vehicle and with the approaching object, and may thus generate a warning signal based on the possibility of such collision.

Figure 5:
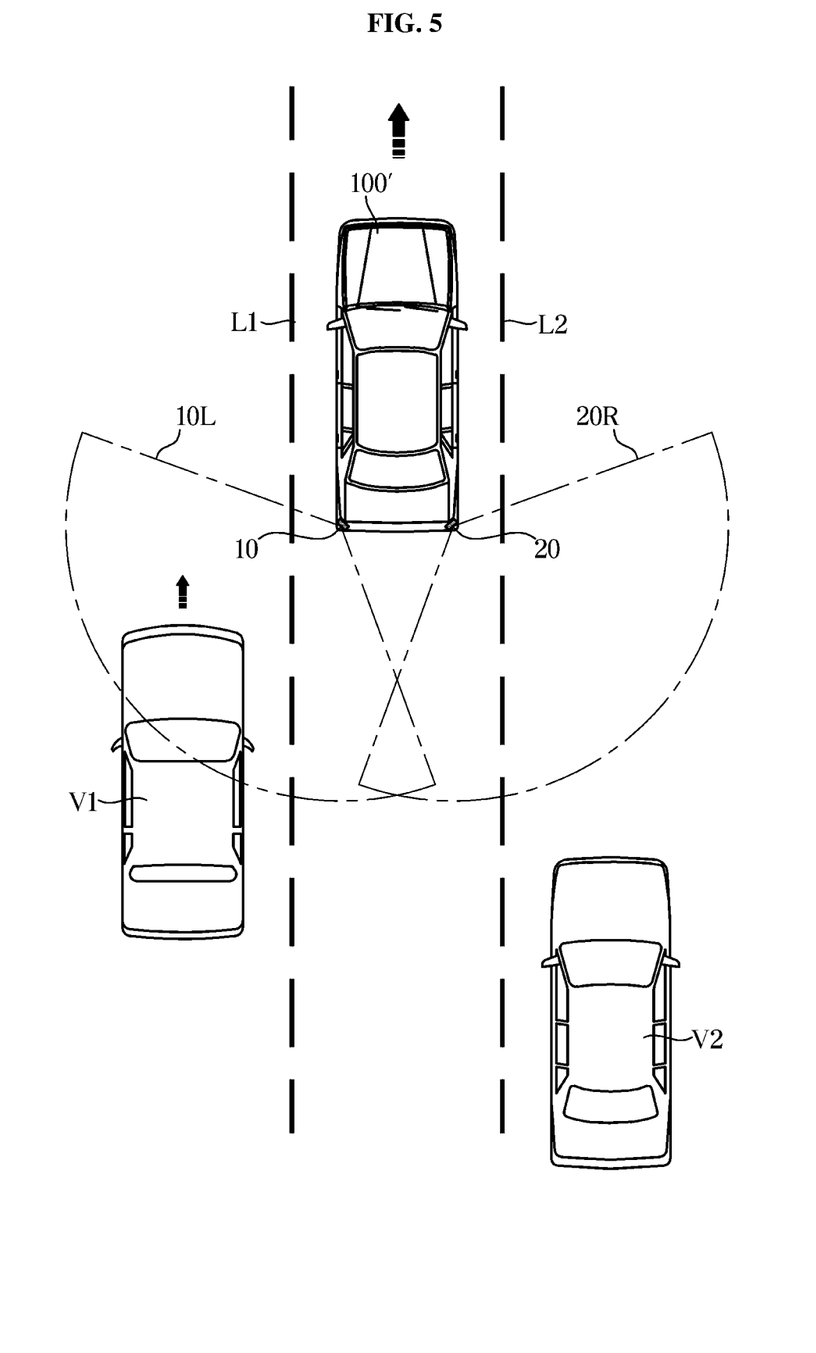
FIG. 5 is a conceptual diagram illustrating a method for operating a radar device of an DAS-embedded vehicle according to an embodiment of the present disclosure.
Figure 6:
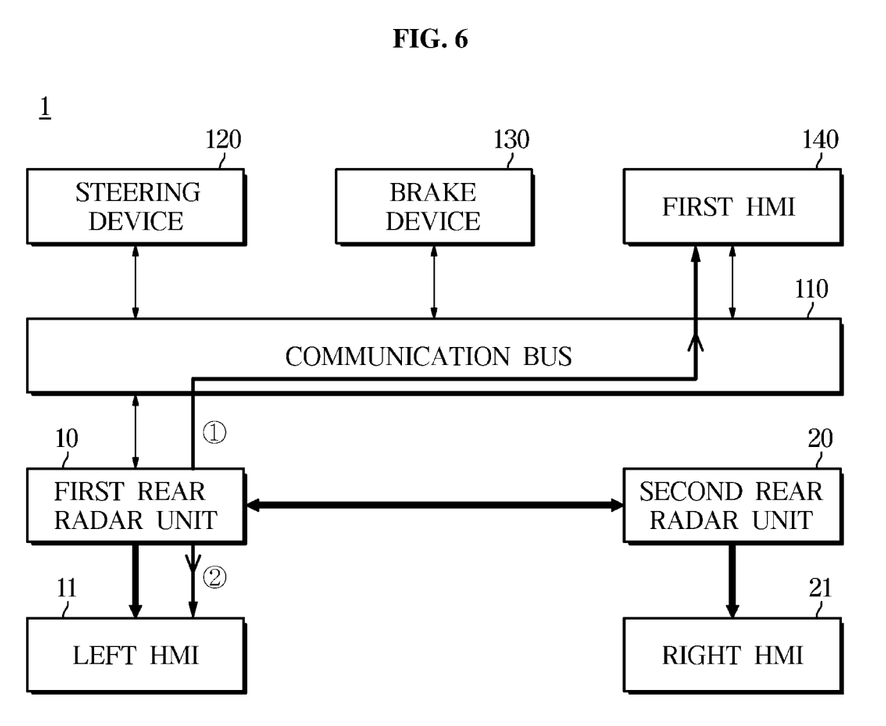
FIG. 6 is a block diagram illustrating flow of a communication signal between constituent elements of the driver assistance system in an operation state of the radar device shown in FIG. 5 according to an embodiment of the present disclosure.

FIG. 5 is a conceptual diagram illustrating a dangerous situation in which the first rear radar unit 10 determines that an object V1 sensed in the rear left region with respect to the vehicle is located in a blind spot such that there is a possibility of collision between the vehicle and the object V1. FIG. 6 is a conceptual diagram illustrating a transmission route of control signals for use in the DAS 1 in the situation shown in FIG. 5.

In more detail, the first sensing unit 15 of the first rear radar unit 10 may detect information about the position and speed of the object V1 located at the rear left region of the vehicle, such that the first controller 16 may determine whether the warning signal is needed due to the object V1, which is located in a blind spot of the rear lateral region of the vehicle, based on the detected position and speed information of the object V1. If the warning signal is needed, the first rear radar unit 10 may display the warning signal on the first HMI 140, or may control the left HMI 11 to display the presence of an obstacle in the rear left region with respect to the vehicle 100.

In other words, when the first controller 16 determines that the warning signal is needed, the first controller 16 may transmit a control signal to the communication bus 110 and the first HMI 140 over CAN communication as illustrated in ①. Moreover, in order to transmit a control signal to the left HMI 11, the first controller 16 may transmit the control signal to the left HMI 11 through Direct Hardwires as illustrated in ②.

Figure 7:
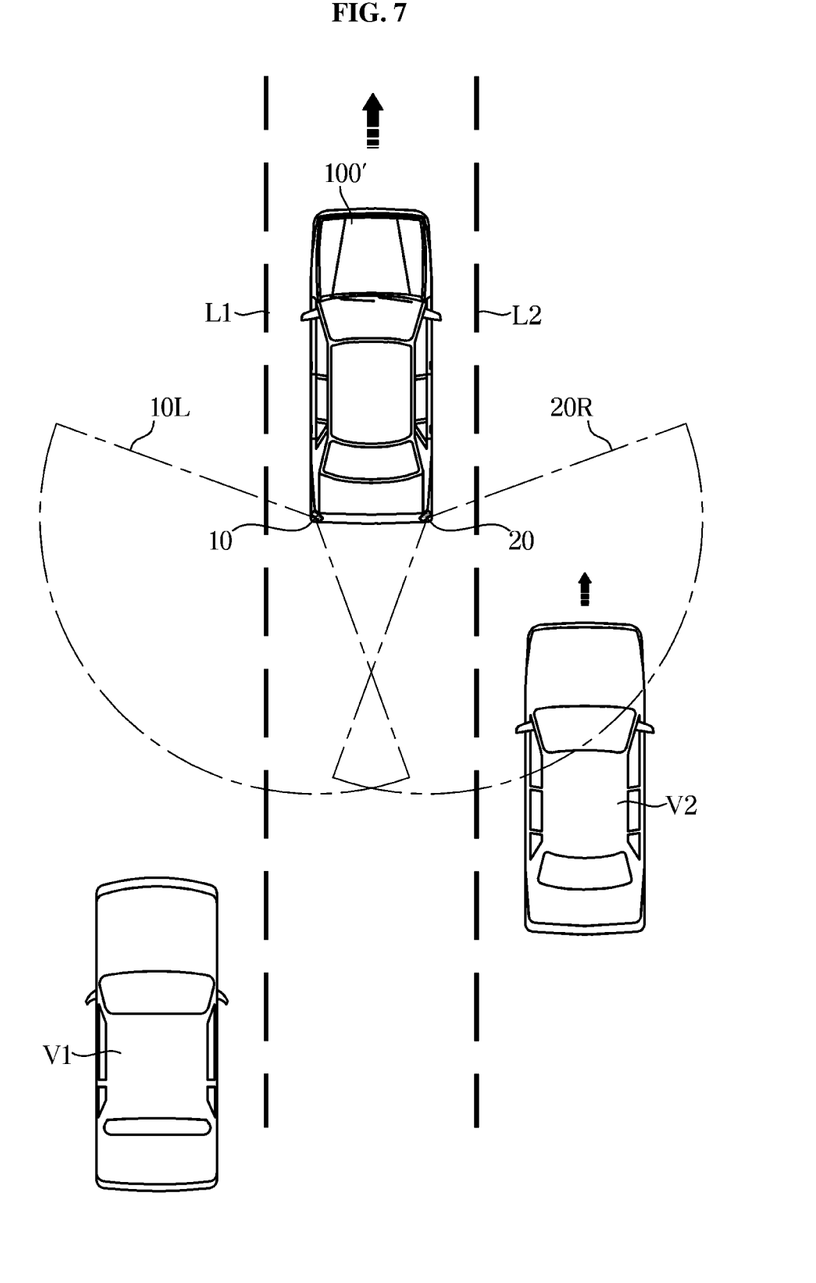
FIG. 7 is a conceptual diagram illustrating an operation state of the radar device of the DAS-embedded vehicle according to an embodiment of the present disclosure.
Figure 8:
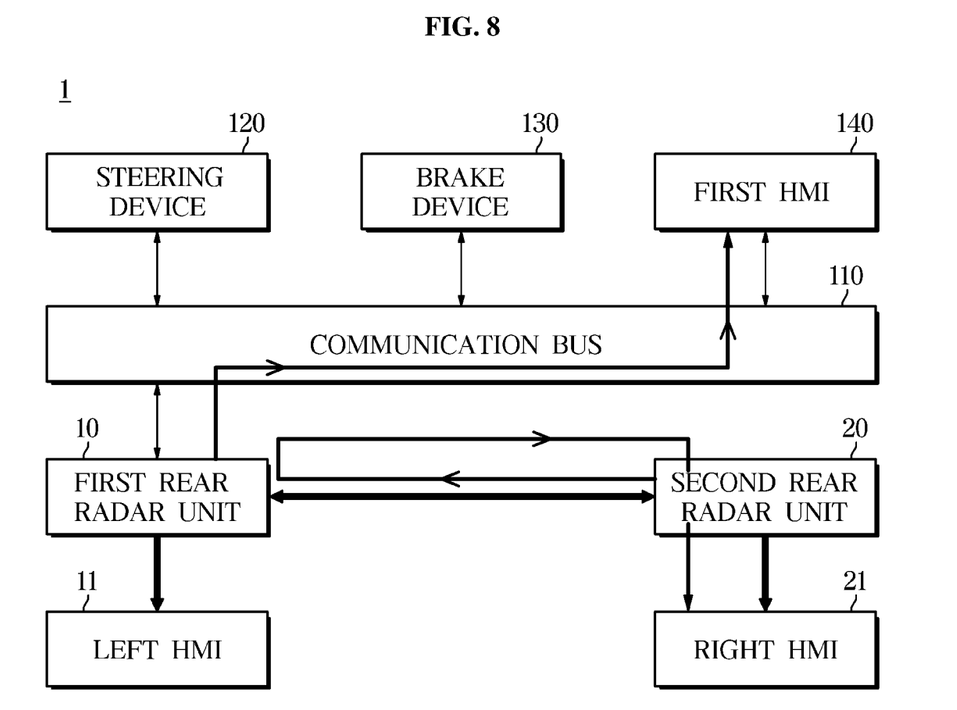
FIG. 8 is a block diagram illustrating flow of a communication signal between constituent elements of the driver assistance system in an operation state of the radar device shown in FIG. 7 according to an embodiment of the present disclosure.

However, if an obstacle is detected in the rear right region with respect to the vehicle such that the warning signal for warning about the detected obstacle is needed, the first controller 16 may transmit the control signal based on another transmission route as shown in FIGS. 7 and 8.

In more detail, FIG. 7 is a conceptual diagram illustrating a dangerous situation in which the first rear radar unit 10 determines that an object V2 sensed in the rear right region with respect to the vehicle moving at high speed is quickly approaching a right lane of the vehicle 100. FIG. 8 is a conceptual diagram illustrating a transmission route of control signals for use in the DAS 1 in the situation shown in FIG. 7.

In more detail, if the second sensing unit 25 of the second rear radar unit 20 acquires information about the position and speed of the object V2 present in the rear right region with respect to the vehicle, the first rear radar unit 10 may acquire the position and speed information of the object V2 through Direct communication lines. Therefore, upon receiving the position and speed information of the object V2, the first controller 16 may determine whether there is a high possibility of a dangerous situation in which the object V2 quickly moves from the rear right region toward the vehicle, and may thus determine whether the warning signal is needed. If the warning signal is needed, the first rear radar unit 10 may display the warning signal on the first HMI 140, or may re-transmit the warning signal that indicates that the obstacle present in the rear right region to the second rear radar unit 20 through Direct communication lines such that the retransmitted warning signal may be displayed on the right HMI 21. Therefore, the second rear radar unit 20 may transmit the warning signal received from the first rear radar unit 10 to the right HMI 21 through Direct Hardwires.

In other words, when the first controller 16 determines that the warning signal is needed, the first controller 16 may transmit a control signal to the communication bus 110 and the first HMI 140 over CAN communication as illustrated in ③. Moreover, in order to transmit a control signal to the right HMI 21, the sensed signal may be transmitted from the second rear radar unit 20 to the first rear radar unit 10 as illustrated in ④. Thereafter, if the dangerous situation is decided, the control signal may be retransmitted from the first rear radar unit 10 to the second rear radar unit 20, such that the warning signal for indicating the dangerous situation may be displayed on the right HMI 21.

However, although each of the first HMI 140, the left HMI 11, and the right HMI 21 has already received the warning control signal, each of the first HMI 140, the left HMI 11, and the right HMI 21 may output the warning signal in response to either the number of reception times of the warning control signal or a traveling control status of the vehicle 100, or may then output the warning signal at a later time.

For example, if the first HMI 140 initially receives the warning control signal, the first HMI 140 may control Human Machine Interfaces (HMIs) to be kept at a first stage. If necessary, only when the driver inputs a signal indicating an intention of the driver who desires to perform lane change, the first HMI 140 may output the warning control signal. In this case, the lane change intention signal of the driver may be acquired based on the operation status of lever switches. If the first HMI 140 outputs the warning control signal, the warning control signal may be blinked at intervals of a blinking cycle. Not only the first HMI 140 but also the left HMI 11 and the right HMI 21 may determine whether to output the control signal in response to individual stages of the warning control signal.

The above-mentioned description has exemplarily disclosed the operations of constituent elements of the DAS 1 and the transmission routes of the communication signals for convenience of description and better understanding of the present disclosure. However, the scope or spirit of the present disclosure is not limited thereto.

Figure 9:
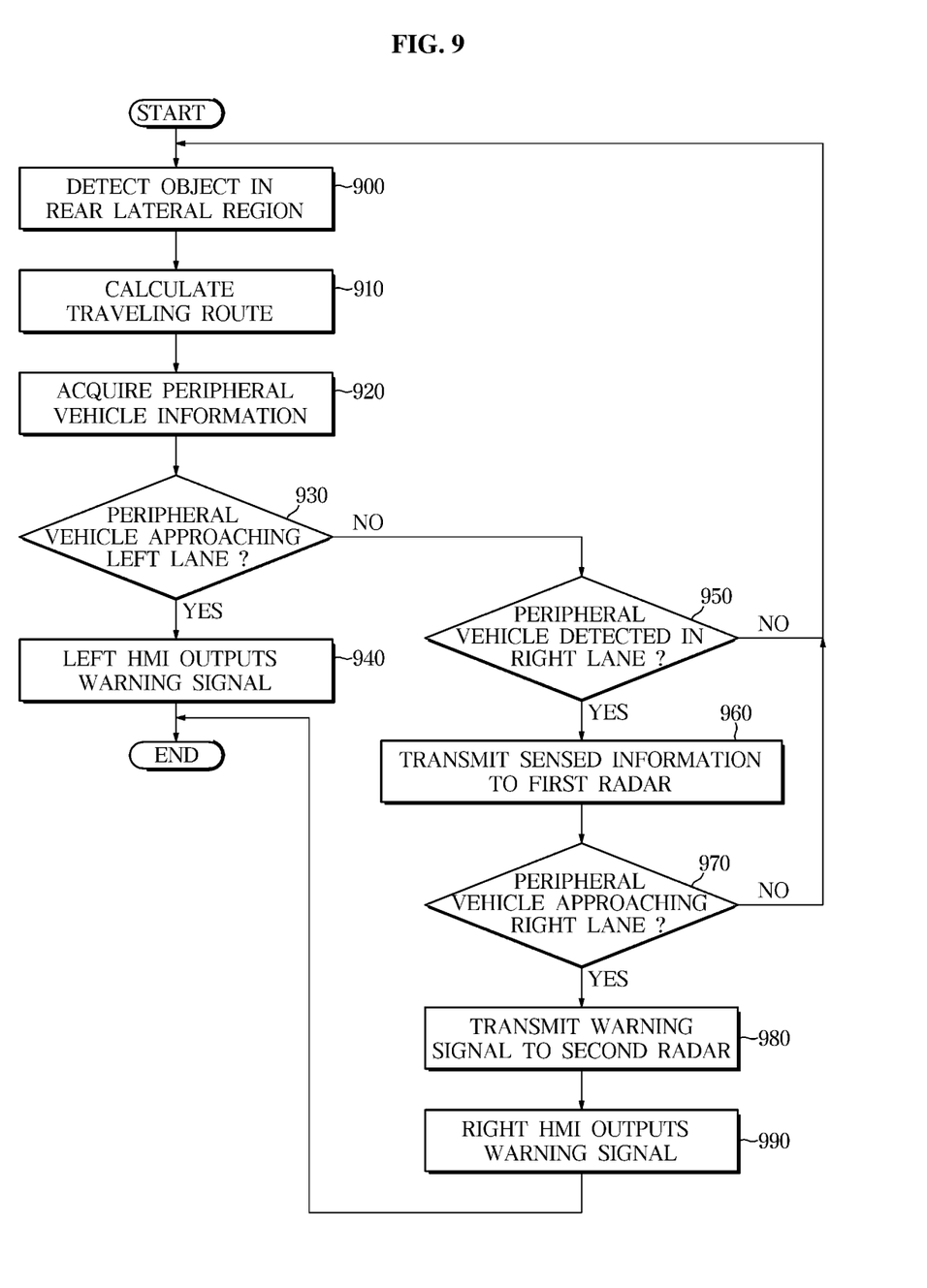
FIG. 9 is a flowchart illustrating a method for operating the driver assistance system according to an embodiment of the present disclosure.

A method for operating the DAS 1 will hereinafter be described in detail. FIG. 9 is a flowchart illustrating a method for operating the driver assistance system according to an embodiment of the present disclosure. Referring to FIG. 9, the vehicle 100 may control the in-vehicle radar units to detect the presence or absence of an object in a rear lateral region (900). That is, each of the first rear radar unit 10 and the second rear radar unit 20 may detect the presence or absence of an object in the rear lateral region of the vehicle 100. In accordance with one embodiment of the present disclosure, the first rear radar unit 10 may detect the presence or absence of an object in the rear left region of the vehicle 100, and the second rear radar unit 20 may detect the presence or absence of an object in the rear right region of the vehicle 100.

In this case, the DAS 1 may additionally receive traveling route information of the vehicle 100, such that the DAS 1 may calculate road route information based on the received traveling route information (910).

In addition, the DAS 1 may acquire peripheral vehicle information based on information about the detected object present in the rear lateral region (920). In this case, the acquired peripheral vehicle information may include both position information and speed information of each peripheral vehicle.

Thereafter, when the detected peripheral vehicle is approaching the left lane (see L1 of FIG. 4) (YES in 930), the left HMI 11 of the DAS 1 may output the warning signal (940). In more detail, the dangerous situation encountered by the detected peripheral vehicle approaching the left lane L1 may be decided by the first controller 16 of the first rear radar unit 10. The warning control signal may be transmitted to the left HMI 11 through Direct Hardwires, such that the left HMI 11 may output the warning signal.

On the other hand, if the detected peripheral vehicle is detected in the right lane instead of the left lane (see L1 of FIG. 5) (YES in 950), sensed information may be transmitted to the first rear radar unit 10. In other words, information as to whether the detected peripheral vehicle is detected in the right lane may be detected by the second rear radar unit 20, and the sensed information may be re-acquired by the first rear radar unit 10.

In this case, when the first rear radar unit 10 determines that the detected peripheral vehicle is approaching the right lane such that there is a high possibility of collision (YES in 970), the first rear radar unit 10 may transmit a warning control signal to the second rear radar unit 20 (980), the warning control signal received by the second rear radar unit 20 may be transmitted to the right HMI 21 through Direct Hardwires such that the right HMI 21 may display the warning control signal.

Although not shown in FIG. 9, not only the left HMI 11 and the right HMI 21, but also the first HMI 140 can output the warning control signal as necessary. For example, if the first rear radar unit 10 determines the presence of a dangerous obstacle in any of available directions with respect to the position of the vehicle, the first rear radar unit 10 may transmit the corresponding warning control signal to the first HMI 140 through the communication bus 110.

As is apparent from the above description, the driver assistance system provided with a radar sensor unit for use in a vehicle according to the embodiments of the present disclosure may effectively prevent a time delay encountered in a data transmission process during data integration of radar sensors.

The driver assistance system according to the embodiments of the present disclosure may improve accuracy of object information using radar sensor units, and may allow only one unit to perform various functions (e.g., a function for determining the possibility of danger or riskiness, a function for generating a warning message, a control function) in an integrated manner.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A driver assistance system comprising:
    a first radar sensor configured to monitor a first rear-lateral sense region, and acquire first radar data from the first rear-lateral sense region;
    a second radar sensor configured to monitor a second rear-lateral sense region, configured to acquire second radar data from the second rear-lateral sense region, receive the first radar data from the first radar sensor through Direct communication, and identify an object based on the first radar data or the second radar data; and
    at least one human machine interface (HMI) configured to display a warning control signal through in-vehicle communication when the second radar sensor performs warning decision,
    wherein the second radar sensor is configured to perform the warning decision either when the object is identified in a predetermined threshold sense region or when the object is approaching the sense region at a higher speed than a threshold speed, and to transmit the warning control signal to the first radar sensor through the Direct communication when the warning decision is carried out.

2. The driver assistance system according to claim 1, wherein the human machine interface (HMI) comprises:

a first human machine interface (HMI) configured to receive the warning control signal from the first radar sensor through Direct Hardwires, and directly output the received warning control signal; and
    a second human machine interface (HMI) configured to receive the warning control signal from the second radar sensor through Direct Hardwires, and directly output the received warning control signal.

3. The driver assistance system according to claim 1, wherein the second radar sensor is configured to calculate route information including curve information of a road on which a vehicle is traveling.

4. The driver assistance system according to claim 2, wherein:
    the human machine interface (HMI) outputs the warning control signal, when the second radar sensor performs warning decision and receives a signal indicating an intention of a vehicle driver who desires to perform lane change.

5. The driver assistance system according to claim 4, wherein each of the first HMI and the second HMI is configured to output the warning control signal as a blinking signal.

6. A method for controlling a driver assistance system comprising:
    acquiring first radar data by a first radar sensor monitoring a first rear-lateral sense region;
    acquiring second radar data by a second radar sensor monitoring a second rear-lateral sense region;
    receiving, by the second radar sensor, the first radar data from the first radar sensor through Direct communication;
    identifying, by the second radar sensor, an object based on the first radar data or the second radar data;
    if the second radar sensor performs warning decision based on the identified object, displaying a warning control signal through in-vehicle communication,
    performing the warning decision either when the object is identified in a predetermined threshold sense region or when the object is approaching the sense region at a higher speed than a threshold speed, and
    transmitting the warning control signal to the first radar sensor through the Direct communication, when the warning decision is carried out.

7. The method according to claim 6, wherein the displaying the warning control signal comprises:
    receiving, by a first human machine interface (HMI), the warning control signal from the first radar sensor through Direct Hardwires, and directly outputting the received warning control signal; and
    receiving, by a second human machine interface (HMI), the warning control signal from the second radar sensor through Direct Hardwires, and directly outputting the received warning control signal.

8. The method according to claim 6, further comprising:
    calculating route information including curve information of a road on which a vehicle is traveling.

9. The method according to claim 7, wherein the displaying the warning control signal further comprises:
    when the second radar sensor performs warning decision and receives a signal indicating an intention of a vehicle driver who desires to perform lane change, outputting the warning control signal.

10. The method according to claim 9, wherein the displaying the warning control signal comprises:
    outputting, by each of the first HMI and the second HMI, the warning control signal as a blinking signal.

11. A radar device comprising:

a first radar sensor configured to monitor a first rear-lateral sense region, and acquire first radar data from the first rear-lateral sense region; and a second radar sensor configured to monitor a second rear-lateral sense region, acquire second radar data from the second rear-lateral sense region, receive the first radar data from the first radar sensor through Direct communication, identify an object based on the first radar data or the second radar data, and transmit a warning control signal to an external device through in-vehicle communication when warning decision is performed based on the identified object, wherein the second radar sensor is configured to perform the warning decision either when the object is identified in a predetermined threshold sense region or when the object is approaching the sense region at a higher speed than a threshold speed, to transmit the warning control signal to the first radar sensor through the Direct communication when the warning decision is carried out.

12. The radar device according to claim 11, wherein the second radar sensor is configured to calculate route information including curve information of a road on which a vehicle is traveling.

13. The radar device according to claim 11, wherein:

the second radar sensor is configured to re-output the warning control signal to the external device when the second radar sensor performs warning decision and receives a signal indicating an intention of a vehicle driver who desires to perform lane change.

14. The radar device according to claim 11, wherein:

the first radar sensor is configured to transmit the warning control signal to a first external device through Direct Hardwires; and the second radar sensor is configured to transmit the warning control signal to a second external device through Direct Hardwires.

* * * * *